(No Model.)

J. EVINOF.
NUT LOCK.

No. 542,879. Patented July 16, 1895.

Witnesses
J. D. Kingsbery
G. A. Vauberschmidt

Inventor
Julius Evinof
By Whitaker & Prevost, Attys.

UNITED STATES PATENT OFFICE.

JULIUS EVINOF, OF LONDON, ENGLAND.

NUT-LOCK.

SPECIFICATION forming part of Letters Patent No. 542,879, dated July 16, 1895.

Original application filed November 19, 1894, Serial No. 529,294. Divided and this application filed May 2, 1895. Serial No. 547,869. (No model.) Patented in England February 8, 1894, No. 2,798; in France November 20, 1894, No. 243,021; in Belgium November 22, 1894, No. 112,840; in Canada January 14, 1895, No. 47,882, and in India February 23, 1895, No. 345.

*To all whom it may concern:*

Be it known that I, JULIUS EVINOF, a subject of the Emperor of Russia, residing at London, England, have invented a new and useful Improvement in Locking Nuts, (for which I have obtained patents in Great Britain, No. 2,798, dated February 8, 1894; in France, No. 243,021, dated November 20, 1894; in Belgium, No. 112,840, dated November 22, 1894; in Canada, No. 47,882, dated January 14, 1895, and in India, Register No. 345, dated February 23, 1895,) of which the following is a specification, this application being a division of my former application, filed November 19, 1894, and given Serial No. 529,294.

My invention is an improvement in nut-locks; and it consists in the novel features hereinafter described, reference being had to the accompanying drawings, which illustrate one form in which I have contemplated embodying my invention, and the invention is fully disclosed in the following description and claim.

Figure 1:
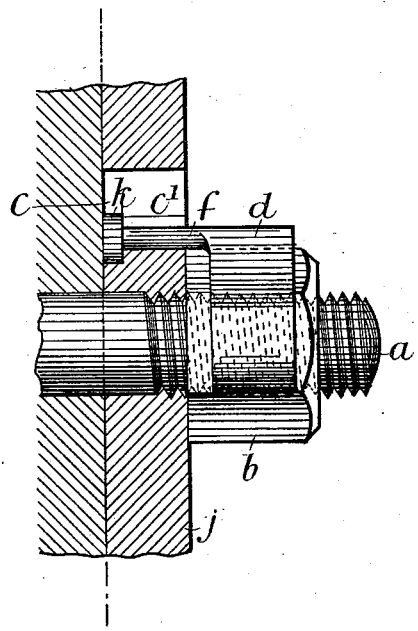
Figure 2:
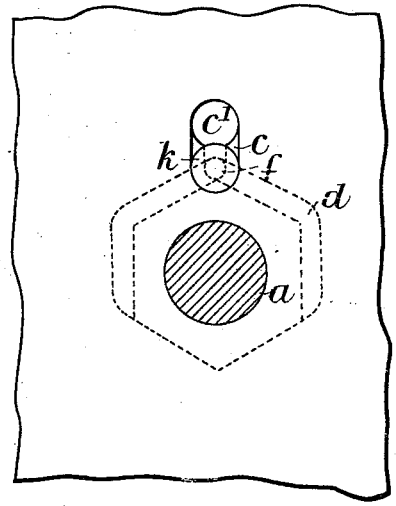

Referring to the drawings, Figure 1 represents an elevation, partly in section, showing a nut and bolt with my invention applied thereto. Fig. 2 is a front view of one of the plates united by the bolt and nut, showing the recess for receiving a part of the nut-locking device.

The improved nut-lock covered by my invention can be employed with the usual nut and bolt without preparing or treating them in any way, and it is particularly adapted for use where one or more plates are to be united, as, for instance, in connection with fish-plates in joining railway-rails; but it may be used in other connections where found desirable.

In the drawings, $a$ represents the bolt, of usual form, and $b$ the nut, also of usual construction.

$j$ represents in this instance a fish-plate which is to be united to a railway-rail. The plate $j$ is provided with a retaining recess or aperture $c$, adjacent to the bolt-hole having its front wall provided, preferably, with a key-hole-slot $c'$.

The locking device proper consists of a strap $d$ for engaging the nut to prevent it from turning, and a stem provided with a retaining device for engaging the recess in the fish-plate to prevent the accidental displacement of the strap. In this instance I have shown the stem $f$ provided with a headed portion $k$ for engaging the recess $c$ and keyhole-slot $c'$ of the plate $j$, so that when the stem is inserted in the recess and moved downwardly it cannot become accidentally displaced.

It is not essential that the retaining-recess $c$ should be of precisely the form shown, as it and the form of the stem $f$ may be varied slightly without departing from the spirit of my invention, it being only necessary that the recess and stem be so formed that the recess will retain the stem when it is placed in engagement therewith.

What I claim, and desire to secure by Letters Patent, is—

The combination with the parts to be joined including a plate provided with a recess having its front wall provided with a key hole slot, of a bolt and nut, and a locking device comprising a bifurcated portion for engaging the sides of the nut to prevent it from turning and a stem having a headed portion for engaging said key-hole slot and recess, substantially as described.

JULIUS EVINOF.

Witnesses:
A. G. DOWLER,
FREDERICK STEPHENS.